| United States Patent [19] | [11] Patent Number: 4,895,906 |
|---|---|
| Wendling et al. | [45] Date of Patent: Jan. 23, 1990 |

[54] POLYCHLOROPRENE MIXTURES

[75] Inventors: Peter Wendling, Leverkusen; Werner Obrecht, Moers; Wilhelm Göbel, Leverkusen; Rüdiger Musch, Bergisch Gladbach; Rudolf Casper, Leverkusen; Eberhard Müller, Dormagen, all of Fed. Rep. of Germany

[73] Assignee: Bayer Aktiengesellschaft, Leverkusen-Bayerwerk, Fed. Rep. of Germany

[21] Appl. No.: 221,430

[22] Filed: Jul. 19, 1988

[30] Foreign Application Priority Data

Jul. 29, 1987 [DE] Fed. Rep. of Germany ....... 3725042

[51] Int. Cl.[4] .................... C08L 11/00; C08L 11/02
[52] U.S. Cl. .................................. 525/194; 525/197; 525/215; 525/236
[58] Field of Search ............... 525/215, 236, 194, 197

[56] References Cited

U.S. PATENT DOCUMENTS

| 3,926,912 | 12/1975 | Mayer-Mader et al. | 525/215 |
|---|---|---|---|
| 3,954,916 | 5/1976 | Mayer-Mader et al. | 525/214 |
| 3,984,609 | 10/1976 | Branlard et al. | 526/78 |
| 4,016,177 | 1/1977 | Mayer-Mader et al. | 525/215 |
| 4,032,541 | 6/1977 | Mayer-Mader et al. | 549/370 |
| 4,482,676 | 11/1984 | Musch et al. | 525/215 |

FOREIGN PATENT DOCUMENTS

| 0089539 | 9/1983 | European Pat. Off. |
|---|---|---|
| 0175245 | 3/1986 | European Pat. Off. |
| 2306610 | 8/1974 | Fed. Rep. of Germany |

*Primary Examiner*—Allan M. Lieberman
*Attorney, Agent, or Firm*—Connolly and Butz

[57] ABSTRACT

The invention relates to a polychloroprene rubber which shows advantages over the prior art in the sum total of its performance properties, namely vulcanization rate, tensile strength, elongation at break, modulus, tear propagation resistance and thermal stability of the vulcanizate.

10 Claims, No Drawings

POLYCHLOROPRENE MIXTURES

This invention relates to a polychloroprene rubber which shows advantages over the prior art in the sum total of its performance properties, namely vulcanization rate, tensile strength, elongation at break, modulus, tear propagation resistance and thermal stability of the vulcanizate.

The prior art in this field comprises polychloroprene rubbers which are produced either in the presence of chain transfer agents, such as mercaptans and xanthogene disulfides, or in the presence of sulfur using suitable modifiers, such as tetraalkyl thiuram disulfides (see Logemann in Houben-Weyl, Methoden der organischen Chemie, Vol. 14/1 (1961), pages 733–752).

The property spectrum of these polychloroprene rubbers representing the prior art is sufficiently well known.

Thus, compared with xanthogene-disulfide-regulated polychloroprene and sulfur-containing polychloroprene, mercaptan-regulated polychloroprene shows lower tensile strengths, lower modulus values and lower tear propagation resistance levels for high thermal stability of the vulcanizates.

It is known that polychloroprene regulated with xanthogene disulfide shows more favorable scorch behavior than mercaptan-regulated polychloroprene and leads to vulcanizates characterized by higher modulus values and higher tensile strengths. Compared with mercaptan-regulated and sulfur-modified polychloroprene, the slower vulcanization rate of polychloroprene regulated with xanthogene disulfide is a disadvantage.

Compared with mercaptan-regulated and xanthogene-disulfide-regulated polychloroprene, sulfur-modified polychloroprene shows a high vulcanization rate and a high level of vulcanizate values (tensile strength, modulus, elongation at break, tear propagation resistance) before ageing. Its disadvantage lies in the marked deterioration in mechanical properties, such as for example tensile strength and elongation at break, which it undergoes on ageing in hot air.

It has now surprisingly been found that the prior art is surpassed in regard to the sum total of vulcanization rate, tensile strength, tear propagation resistance, elongation at break, modulus and thermal stability of polychloroprene vulcanizates if the latices of unpeptized or partially peptized, sulfur-modified polychloroprene and of xanthogene-disulfide-regulated polychloroprene are mixed, the sulfur-modified polychloroprene is peptized in the presence of the xanthogene-disulfide-regulated polychloroprene, the polymer is stabilized and then isolated from the latex in accordance with the prior art, for example by freeze coagulation.

This result was surprising insofar as the properties of the polychloroprene rubber produced in accordance with the invention are not additively composed of the properties of the individual constituents of the mixture. The property spectrum of the polychloroprene rubber produced in accordance with the invention also cannot be established with rolled mixtures of the polychloroprene rubbers separately isolated from the latices. The production of a polychloroprene rubber from a co-peptized latex mixture of mercaptan-regulated and sulfur-modified polychloroprene does not produce the same result either.

The present invention relates to a polychloroprene rubber which is produced from a mixture of sulfur-modified and xanthogene-disulfide-regulated polychloroprene by mixing the latices of the respective polychloroprene rubbers, peptizing them together, stabilizing the mixture and isolating the polymer from the latex, unpeptized or partially peptized polymer being used as the sulfur-modified polychloroprene.

The isolated solid rubber has a Mooney viscosity (ML 1+4/100° C.) of 5 to 150 and preferably 20 to 120 Mooney units.

The content of sulfur-modified polychloroprene in the solid rubber blend is between 5 and 95% by weight and preferably between 10 and 75% by weight.

Suitable polychloroprene rubbers are those in which both the sulfur-modified polychloroprene and the xanthogene-disulfide-regulated polychloroprene contain up to 20% by weight comonomer. The preferred comonomer is 2,3-dichlorobutadiene.

The sulfur-modified polychloroprene is produced, for example, as described in the following Offenlegungsschrifts and Patents: DE-OS No. 2 018 736, EP No. 0 021 212, DE-OS No. 3 246 748 and DE-OS No. 3 507 825.

The sulfur-modified polychloroprene is used in unpeptized or partially peptized form for the production of the mixture of sulfur-modified polychloroprene and xanthogene-disulfide-regulated polychloroprene.

In the first case, the sulfur-modified polychloroprene is produced, for example, in accordance with DE-OS No. 2 018 736, peptization only being carried out after addition of the xanthogene-disulfide-regulated polychloroprene, as described in DE-OS No. 2 018 736. The sulfur-modified polychloroprene is not completely soluble in benzene or toluene before the peptization and is characterized by the presence of fractions soluble and insoluble in those solvents.

Partially peptized sulfur-modified polychloroprene is obtained, for example, in accordance with DE-OS No. 3 246 748 providing only a fraction of the maximum quantity of peptizing agent required is used in the first step of the peptization process. Peptization is then continued after addition of the xanthogene-disulfide-regulated polychloroprene. The partially peptized sulfur-modified polychloroprene has a Mooney viscosity of 70 to 120 MU (ML 1+4/100° C.) and is completely soluble in benzene or toluene.

Sulfur-modified polychloroprene of the type obtained in accordance with DE-OS No. 3 507 825 is also suitable for the preparation of the latex mixtures. In this case, the peptizing agent is only used in such a quantity in the polymerization step that partially peptized products are obtained, being further peptized after mixing with xanthogene-disulfide-regulated polychloroprene. Another possibility is to add the xanthogene-disulfide-regulated polychloroprene to a polymerization mixture in which sulfur-modified polychloroprene is prepared in accordance with DE-OS No. 2 018 736. In this case, 10% to 20% of the polymerization, including peptization, is carried out in the presence of the sulfur-modified polychloroprene.

The quantity of elemental sulfur used in the production of the sulfur-modified polychloroprene is between 0.05 and 1.5% by weight and preferably between 0.1 and 1.0% by weight, based on monomer.

Where the peptization of the sulfur-modified polychloroprene is carried out without further additions of latex and where the polymer is isolated from the latex, it has been found that sulfur-modified polychloroprene rubbers situated in the molecular weight range characterized by Brookfield viscosities of 20,000 cP (20° C.) up to Mooney viscosities ML 1+4 (100° C.) of 150 are suitable. Sulfur-modified polychloroprene rubbers with Mooney values ML 1+4 (100° C.) in the range from 10 to 120 Mooney units are preferred.

Suitable xanthogene-disulfide-regulated polychloroprene rubbers are those described, for example, in U.S. Pat. Nos. 2,321,693 and 2,567,117 or in GB-P Nos. 512,458 and 952,156 or in DE-OS No. 1 186 215. Preferred xanthogene-disulfide-regulated polychloroprene rubbers are those produced in accordance with DE-OS Nos. 3 044 811, 2 306 610 and 2 156 453. The Mooney viscosities ML 1+4 (100° C.) of separately worked-up, xanthogene-disulfide-regulated polychloroprenes are between 5 and 150 and preferably between 10 and 10 Mooney units.

The latices are mixed either before termination of polymerization and the removal of unreacted monomers or after termination and the removal of unreacted monomers. Both terminated and non-terminated latices may be mixed. The statement is also intended to cover a mixture of the polymerizing latices in which the last 10 to 20% of the polymerization of at least one of the two polychloroprenes is carried out in the latex mixture.

Suitable polymerization terminators are, for example, pyrocatechol and, preferably, diethyl hydroxylamine which is used in a quantity of 0.05 to 0.15% by weight, based on monomer, preferably in the form of an aqueous solution.

The co-peptization of the sulfur-modified polychloroprene with xanthogene-disulfide-regulated polychloroprene is carried out using the chemicals mentioned in the patents cited above, particularly thiuram disulfides and xanthogene disulfides, either individually or in combination with amines, xanthogenates, dithiocarbamates, sulfite, thiosulfate, formamidine sulfinate, formaldehyde sulfoxylate, 2-mercapto-1,3-benzthiazole and mixtures thereof.

Conventional antiagers, such as sterically hindered phenol derivatives, amines, phosphites, xanthogene disulfides or thiuram disulfides, are used to improve the stability of the polymers in storage. Preferred anti tetraalkyl thiuram disulfides, optionally in combination with compounds belonging to the other classes. The antiager is added to the latex in the form of an aqueous dispersion, organic solution or aqueous emulsion of an organic solution before or after removal of unreacted monomers. Up to 6% by weight tetraethyl thiuram disulfide (TETD) or a corresponding molar quantity of another compound or mixtures of compounds is used.

The solid rubber is isolated from the latex mixture, for example, by freeze coagulation of the latex on a roll, as described in U.S. Pat. No. 2,187,146.

The following Examples are intended to illustrate the invention without limiting it in any way.

EXAMPLES ACCORDING TO THE INVENTION
(1a–1d)

Sulfur-modified polychloroprene

The sulfur-modified polychloroprene was prepared substantially in accordance with DE-OS No. 20 18 736, Example 1, except that, instead of 0.6% by weight, 0.5% by weight elemental sulfur, based on the monomer mixture, was used. The monomer mixture contained 1.2% by weight of 2,3-dichlorobutadiene. The polymerization was activated with potassium persulfate and silver salt, as described in the cited patent, and was completed at 45° C. up to a conversion of 65%. The polymerization was terminated as described in the cited patent.

Part of the unpeptized polychloroprene latex was separately worked up for characterization. The gel content in toluene was 75% by weight while the Mooney viscosity ML 1+4 (100° C.) measured 180.

For comparison tests and for further characterization of the sulfur-modified polychloroprene latex, another part of the latex was separately peptized, freed from unreacted monomers and worked up.

2.0% by weight tetraethyl thiuram disulfide, as opposed to the 1.0% by weight used in Example 3 of DE-OS No. 2 018 736, and 0.1% by weight dibutylamine, based in each case on the original monomer mixture were used for the peptization. For the comparison tests, the sulfur-modified polychloroprene was peptized to a Mooney value ML 1+4 (100° C.) of 50.

To characterize the sulfur-modified polychloroprene, part of the latex was fully peptized to the lowest reachable Mooney value. This Mooney value, ML 1+4 (100° C.), measured 15.

The other part of the sulfur-modified polychloroprene latex was mixed with xanthogene-disulfide-regulated polychloroprene latex before the removal of unreacted monomer and before peptization and then co-peptized therewith, degassed, stabilized and worked up (see latex mixing and copeptization).

Xanthogene-disulfide-regulated polychloroprene

The xanthogene-disulfide-regulated polychloroprene was prepared in accordance with DE-OS No. 2 306 610 or EP-OS No. 53 319 using 0.74% by weight bis-(5-ethyl-1,3-dioxan -5-yl-methyl)xanthogene disulfide, based on monomer, at a temperature of 35° C. Polymerization was activated with formamidine sulfinic acid, being continued to a conversion of 65% and terminated by the addition of 0.1% by weight, based on latex, of a 2.5% by weight aqueous diethyl hydroxylamine solution.

Before unpeptized sulfur-modified polychloroprene was mixed with the latex, part of the latex was separately degassed and worked up for the Comparison Examples. The xanthogene-disulfide-regulated polychloroprene had a Mooney viscosity ML 1+4 (100° C.) of 53.

Latex mixing and co-peptization

The unpeptized, sulfur-modified polychloroprene latex and the xanthogene-disulfide-regulated polychloroprene latex were mixed in different ratios (Examples 1a to 1d), co-peptized, degassed and worked up. 2.0% by weight tetraethyl thiuram disulfide and 0.1% by weight dibutylamine, based on the solids content of the sulfur-modified polychloroprene component, were used for peptization.

Examples according to the invention (2a–2d)

For the tests of these polychloroprene rubbers produced in accordance with the invention, the sulfur-modified polychloroprene was prepared as described in Examples 1a to 1d. Diisopropyl xanthogene disulfide was used in a quantity of 0.62 part by weight, based on 100 parts by weight monomer, for the preparation of the xanthogene-disulfide-regulated polychloroprene. The other preparation conditions for the xanthogene-disulfide-regulated polychloroprene were identical with those of the xanthogene-disulfide-regulated polychloroprene used for Examples 1a to 1d.

Part of the polychloroprene regulated with diisopropyl xanthogene disulfide was separately worked up for comparison tests. It had a Mooney viscosity ML 1+4 (100° C.) of 50 Mooney units.

In contrast to Examples 1a to 1d, the two latices were separately freed from unreacted monomer and then mixed in different ratios, peptized and worked up (for mixing ratios, see Tables).

The peptization conditions were identical with those selected for Examples 1a to 1d.

COMPARISON EXAMPLES

COMPARISON EXAMPLE 1

Comparison Example 1 was carried out in accordance with DE-OS No. 2 306 610 in the presence of bis-(5-ethyl-1,3-dioxan-5-yl-methyl)-xanthogene disulfide and corresponds to the xanthogene-disulfide-regulated polychloroprene used for Examples 1a to 1d which was separately worked up without additions of sulfur-modified polychloroprene.

COMPARISON EXAMPLE 2

Comparison Example 2 was carried out in the presence of diisopropyl xanthogene disulfide and corresponds to the xanthogene-disulfide-regulated polychloroprene used for Examples 2a to 2d according to the invention which was separately worked up without additions of sulfur-modified polychloroprene.

COMPARISON EXAMPLE 3

Comparison Example 3 is a mercaptan-regulated polychloroprene and was prepared in accordance with DE-OS No. 3 002 711, Example 13.

COMPARISON EXAMPLE 4

Comparison Example 4 is the sulfur-modified polychloroprene of Examples 1a to 1d which was peptized and worked up without additions of xanthogene-disulfide-regulated polychloroprene. It had a Mooney value ML 1+4 (100° C.) of 50 Mooney units.

COMPARISON EXAMPLE 5

This Comparison Example describes a polymer blend of sulfur-modified polychloroprene and mercaptan-regulated polychloroprene. The sulfur-modified polychloroprene corresponds to that of Examples 1a to 1d according to the invention. The mercaptan-regulated polychloroprene was prepared in accordance with DE-OS No. 3 002 711, Example 13, and had a Mooney viscosity ML 1+4 (100° C.) of 53.

The latex mixture was prepared and the subsequent peptization carried out in the same way as described in Examples 1a to 1d. The polychloroprene blend obtained had a Mooney viscosity ML 1+4 (100° C.) of 48.

COMPARISON EXAMPLES 6a–c

The peptized, sulfur-modified polychloroprene and the xanthogene-disulfide-regulated polychloroprene were separately worked up in the same way as described in Examples 1a–d.

Three polymer blends of different composition were prepared on a roll from these two solid rubbers.

Comparison Example 6a consists of 90 parts by weight xanthogene-disulfide-regulated polychloroprene and 10 parts by weight sulfur-modified polychloroprene and has a Mooney viscosity ML 1+4 (100° C.) of 54 MU. Comparison Examples 6b and 6c have mixing ratios (in parts by weight) of 70:30 and 50:50 and Mooney viscosities ML 1+4 (100° C.) of 50 and 45 MU. The mixing ratios correspond to those of Examples 1a, 1c and 1d according to the invention.

The polymers resulting from the Examples and Comparison Examples were subjected to the following tests:

(b) Crude rubber tests

The Mooney viscosity (ML 1+4) was determined at 100° C. in accordance with DIN 53 523, Part 1-3.

(c) Vulcanization and Vulcanizate Tests

The vulcanizations were carried out on the basis of two mixtures:

Mixture 1 (ISO mixture 2475):

100.0 parts by weight polymer
30.0 parts by weight carbon black (N 762)
0.5 part by weight stearic acid
2.0 parts by weight phenyl-β-naphthylamine
4.0 parts by weight magnesium oxide
5.0 parts by weight zinc oxide, active
0.5 part by weight ethylene thiourea Mixture 2 (DIN 53 670, Part 5):

100.0 parts by weight polymer
30.0 parts by weight carbon black (N 762)
0.5 part by weight stearic acid
4.0 parts by weight magnesium oxide
5.0 parts by weight zinc oxide, active The test mixtures prepared were vulcanized at 150° C. in a shear vulcameter (DIN 53 529) and the values $t_{10}$, $t_{80}$ and $t_R$ determined $t_{10}$ and $t_{80}$ are the times at which 10% and 80% of the conversion measurable in the vulcameter are reached; $t_R$ is the difference between $t_{80}$ and $t_{10}$.

Tensile strength, elongation at break and modulus at 300% elongation were determined on the vulcanizate after vulcanization for 30 minutes in accordance with DIN 53 504.

Tear propagation resistance was determined on an R 2 standard ring in accordance with DIN 53 504. To this end, the ring was provided on its inside with 2×5 adjacent, 1 mm deep notches. The interval between the notches was 2 mm. The two groups of 5 notches were opposite one another.

The notched rings were placed on rollers having the dimensions for the R 2 standard ring (cf. DIN 53 504, Table 3) and tension-stressed to failure in a tensile testing machine at a rate of advance of 700 mm/min.

The tear propagation resistance W or the structural strength is reduced to the prescribed thickness $d_o=4$ mm in accordance with the following equation and expressed in N:

$$W = W_{meas.} \times \frac{d}{d_o}$$

where

W [N] = target tear propagation resistance
$W_{meas.}$ [N] = measured tear propagation resistance
$d_o$ [mm] = prescribed thickness
d [mm] = measured thickness The vulcanizates obtained with mixture 1 were stored for 14 days at 100° C. The stored vulcanizates were tested for tensile strength and elongation at break.

(d) Results

Series 1

These tests show that Examples 1a to 1d according to the invention achieve a high level in the sum total of vulcanization rate, tensile strength, elongation at break, modulus, tear propagation resistance and thermal stability which is not achieved by Comparison Examples 1, 2, 3 or 4.

Thus, Comparison Examples 1 and 2 although showing good vulcanizate properties do not reach the vulcanization rate of the Examples according to the invention. For a comparable vulcanization rate, Comparison Example 3 shows distinctly poorer vulcanizate properties before and after ageing than the products produced in accordance with the invention. Comparison Example 4 shows a distinctly poorer ageing resistance of the vulcanizate compared with the Examples according to the invention.

Series 2

The results of this series show that, in contrast to the Examples according to the invention, a mixture of mercaptan-regulated and sulfur-modified polychloroprene (Comparison Example 5) vulcanizes inadequately in the absence of vulcanization accelerator.

Series 3

This series shows that Examples 1a, 1c and 1d according to the invention are superior to rolled blends of peptized, sulfur-modified polychloroprene and xanthogene-disulfide-regulated polychloroprene (Comparison Examples 6a, b, c) in the sum total of tensile strength, elongation at break, modulus, tear propagation resistance and thermal stability. In particular, the vulcanizates of the rolled blends show poorer tensile strength and tear propagation resistance levels than the Examples according to the invention.

Series 1

Comparison of Examples according to the invention with xanthogene-disulfide regulated and mercaptan-regulated polychloroprene

| | Mixture constituents of the blend | | | | Vulcanization | | |
|---|---|---|---|---|---|---|---|
| | Regulated CR [parts by weight] | Regulator | Sulfur-modified CR [parts by weight] | ML 1 + 4 [MU] | $t_{10}$ [mins] | $t_{80}$ [mins] | $t_R$ [mins] |
| | | | | | Mixture 1 | | |
| Example 1a | 90 | 1 | 10 | 50 | 3 | 20 | 17 |
| Example 1b | 80 | 1 | 20 | 52 | 3 | 19 | 16 |
| Example 1c | 70 | 1 | 30 | 50 | 3 | 17 | 14 |
| Example 1d | 50 | 1 | 50 | 48 | 3 | 14 | 11 |
| Example 2a | 90 | 2 | 10 | 50 | 4 | 20 | 16 |
| Example 2b | 80 | 2 | 20 | 48 | 3 | 17 | 14 |
| Example 2c | 70 | 2 | 30 | 50 | 3 | 16 | 13 |
| Example 2d | 50 | 2 | 50 | 49 | 3 | 13 | 10 |
| Comparison Example 1 | 100 | 1 | 0 | 53 | 4 | 23 | 19 |
| Comparison Example 2 | 100 | 2 | 0 | 50 | 4 | 22 | 18 |
| Comparison Example 3 | 100 | 3 | 0 | 53 | 3 | 16 | 13 |
| | | | | | Mixture 1 (without accelerator) | | |
| Comparison Example 4 | 0 | — | 100 | 50 | 4 | 11 | 7 |

| | Mixture constituents of the blend | | | | Vulcanizate properties before ageing | | | Vulcanizate properties after ageing (14 days/100° C.) | | |
|---|---|---|---|---|---|---|---|---|---|---|
| | Regulated CR [parts by weight] | Regulator | Sulfur-modified CR [parts by weight] | ML 1 + 4 [MU] | Tensile strength [MPa] | Elongation at break [%] | $M_{100}$ [MPa] | Tear propagation resistance [N] | Tensile strength [MPa] | Elongation at break [%] |
| | | | | | Mixture 1 | | | | | |
| Example 1a | 90 | 1 | 10 | 50 | 21.6 | 480 | 2.7 | 212 | 19.7 | 440 |
| Example 1c | 70 | 1 | 30 | 50 | 21.7 | 500 | 2.4 | 208 | 21.1 | 485 |
| Example 1d | 50 | 1 | 50 | 48 | 21.3 | 490 | 2.5 | 186 | 19.2 | 440 |
| Example 2a | 90 | 2 | 10 | 50 | 21.5 | 490 | 2.3 | 185 | 17.6 | 380 |
| Example 2c | 70 | 2 | 30 | 50 | 21.7 | 490 | 2.4 | 193 | 18.0 | 400 |
| Example 2d | 50 | 2 | 50 | 49 | 20.9 | 470 | 2.5 | 194 | 18.2 | 370 |
| Comparison Example 1 | 100 | 1 | 0 | 53 | 22.2 | 500 | 2.6 | 213 | 20.2 | 455 |
| Comparison Example 2 | 100 | 2 | 0 | 50 | 22.0 | 480 | 2.5 | 191 | 20.2 | 420 |
| Comparison Example 3 | 100 | 3 | 0 | 53 | 18.4 | 420 | 2.4 | 153 | 16.9 | 360 |
| | | | | | Mixture 1 (without accelerator) | | | | | |
| Comparison Example 4 | 0 | — | 100 | 50 | 20.5 | 580 | 2.2 | 220 | 17.0 | 380 |

1 bis-(5-ethyl-1,3-dioxan-5-yl-methyl)-xanthogene disulfide
2 diisopropyl xanthogene disulfide
3 n-dodecyl mercaptan

Series 2

Comparison of an Example according to the invention with a polymer mixture of mercaptan-regulated polychloroprene and sulfur-modified polychloroprene

| | Regulated CR [parts by weight] | Regulator | Sulfur-modified CR [parts by weight] | ML 1 + 4 [MU] | Vulcanization $t_{10}$ | $t_{80}$ [mins] | $t_R$ | Vulcanizate properties Tensile strength [MPa] | Elongation at break [%] | $M_{300}$ [MPa] |
|---|---|---|---|---|---|---|---|---|---|---|
| | | | | | Mixture 2 | | | | | |
| Example 1a | 90 | 1 | 10 | 50 | 4 | 32 | 28 | 13.1 | 620 | 4.8 |
| Comparison Example 5 | 90 | 3 | 10 | 48 | 5 | 31 | 26 | inadequately vulcanized* | | |

1 bis-(5-ethyl-1,3-dioxan-5-yl-methyl)-xanthogene disulfide
3 n-dodecyl mercaptan
*the test specimens actually distorted on removal from the mold

Series 3

Comparison of Examples according to the invention with rolled blends

| | Vulcanization $t_{10}$ [mins] | $t_{80}$ [mins] | $t_R$ [mins] | Vulcanizate properties Tensile strength [MPa] | Elongation at break [%] | $M_{100}$ [MPa] | Tear propagation resistance [N] | Tensile Strength after 14 days [MPa] | Elongation at break at 100° C. [%] |
|---|---|---|---|---|---|---|---|---|---|
| | | | Mixture 1 | | | | | | |
| Example 1a[1] | 3 | 20 | 17 | 21.6 | 480 | 2.7 | 212 | 19.7 | 440 |
| Example 1c[1] | 3 | 17 | 14 | 21.7 | 500 | 2.4 | 208 | 21.1 | 485 |
| Example 1d[1] | 3 | 14 | 11 | 21.3 | 490 | 2.5 | 186 | 19.2 | 440 |
| Comparison Example 6a | 2 | 19 | 17 | 19.5 | 480 | 2.3 | 157 | 17.9 | 420 |
| Comparison Example 6b | 3 | 16 | 13 | 19.2 | 490 | 2.3 | 165 | 18.0 | 435 |
| Comparison Example 6c | 3 | 15 | 12 | 19.2 | 470 | 2.2 | 171 | 17.7 | 420 |

[1]parts by weight of the individual polychloroprenes, see series 1

We claim:

1. A polychloroprene rubber composition produced by mixing sulfur-modified polychloroprene with xanthogene-disulfide-regulated polychloroprene in a ratio of 95:5 to 5:95, characterized in that the rubbers are mixed in the form of their latices, co-peptized and isolated from the latex mixture.

2. A polychloroprene rubber composition as claimed in claim 1, characterized in that the polychloroprene rubber has a Mooney viscosity ML 1+4 (100° C.) of from 5 to 150 Mooney units.

3. A polychloroprene rubber composition as claimed in claim 1, characterized in that both the sulfur-modified polychloroprene and the xanthogene-disulfide-regulated polychloroprene contain up to 20% by weight comonomer.

4. A polychloroprene rubber composition as claimed in claim 3, characterized in that the comonomer is 2,3-dichlorobutadiene.

5. A polychloroprene rubber composition as claimed in claim 1, characterized in that the xanthogene disulfide corresponding to the following general formula

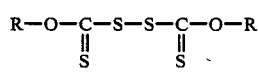

in which the substituents R may be the same or different and represent $C_1$–$C_8$ alkyl, is used for the preparation of the xanthogene-disulfide-regulated polychloroprene.

6. A polychloroprene rubber composition as claimed in claim 5, characterized in that the substituents R may be the same or different and represent

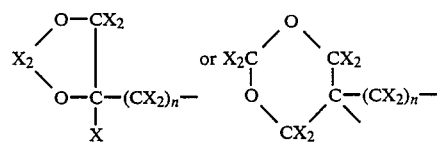

X represents H, alkyl, aryl, arylakyl or halogen and n=1 to 20.

7. A polychloroprene rubber composition as claimed in claim 6, characterized in that, in the xanthogene disulfides used, the two substituents R are the same and X is hydrogen or alkyl.

8. A polychloroprene rubber composition as claimed in claim 1, characterized in that the xanthogene-disulfide-regulated polychloroprene has a Mooney viscosity ML 1+4 (100° C.) of from 5 to 150 Mooney units.

9. A polychloroprene rubber composition as claimed in claim 1, characterized in that the sulfur-modified polychloroprene is prepared with a quantity of elemental sulfur of from 0.05 to 1.5% by weight.

10. Rubber articles comprising a molded, vulcanizate of the polychloroprene rubber composition as claimed in claim 1.

* * * * *

UNITED STATES PATENT AND TRADEMARK OFFICE
CERTIFICATE OF CORRECTION

PATENT NO. : 4,895,906

DATED : January 23, 1990

INVENTOR(S) : Peter Wendling, Werner Obrecht, Wilhelm Gobel, Rudiger Musch, Rudolf Casper and Eberhard Muller It is certified that error appears in the above-identified patent and that said Letters Patent is hereby corrected as shown below:

Front page, last line of item [56], the Attorney, Agent or Firm should correctly read --Connolly and Hutz--;

Column 3, line 15, "10 and 10" should read --10 and 120--;

Column 3, line 43, after "Preferred", the word "anti" should correctly read --antiagers are--.

Signed and Sealed this

Nineteenth Day of March, 1991

Attest:

HARRY F. MANBECK, JR.

*Attesting Officer*   *Commissioner of Patents and Trademarks*